US010257414B2

(12) United States Patent
Zobel (10) Patent No.: US 10,257,414 B2
(45) Date of Patent: Apr. 9, 2019

(54) METHOD AND SYSTEM FOR SMART GROUP PORTRAIT (71) Applicant: QUALCOMM Incorporated, San Diego, CA (US)

(72) Inventor: Pia Zobel, Tirat Hacarmel Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/211,480

(22) Filed: Jul. 15, 2016

(65) Prior Publication Data
US 2018/0020156 A1    Jan. 18, 2018

(51) Int. Cl.
G06K 9/00 (2006.01)
H04N 5/232 (2006.01)
G06K 9/03 (2006.01)

(52) U.S. Cl.
CPC ..... H04N 5/23219 (2013.01); G06K 9/00228 (2013.01); G06K 9/00302 (2013.01); G06K 9/036 (2013.01)

(58) Field of Classification Search
CPC ........... H04N 5/23219; G06K 9/00228; G06K 9/00302
See application file for complete search history.

(56) References Cited

U.S. PATENT DOCUMENTS

2006/0061598 A1    3/2006 Mino et al.
2008/0316327 A1*   12/2008 Steinberg ........... G06K 9/00248
                                                    348/222.1
2008/0317455 A1*   12/2008 Abe .................. H04N 5/23212
                                                    396/263
2011/0013038 A1    1/2011 Kim et al.
2011/0058050 A1    3/2011 Lasang et al.
2011/0211732 A1    9/2011 Rapaport
2013/0028509 A1    1/2013 Moon et al.
2014/0307960 A1    10/2014 Sharma et al.
2014/0347514 A1*   11/2014 Neghina ............... H04N 5/232
                                                    348/222.1

(Continued)

FOREIGN PATENT DOCUMENTS

EP    2124186 A1    11/2009

OTHER PUBLICATIONS

International Search Report and Written Opinion—PCT/US2017/033849—ISA/EPO—dated Sep. 6, 2017.

(Continued)

Primary Examiner — Tom Y Lu
(74) Attorney, Agent, or Firm — Paradice and Li LLP (57) ABSTRACT Various systems and methods are provided for capturing an image of a group of individuals in a scene. Facial detection may be performed to identify one or more individuals of the group. One or more features of each identified individual are monitored to determine an image quality score for the individual, indicative of how the individual will appear in a captured image of the group. A determination is made as to whether the image quality score for the individual satisfies one or more image quality threshold values. If the image quality score for the individual satisfies the one or more threshold values, a sub-image may be captured of the individuals. Sub-images for each individual may be combined to form a single composite image of the group.

20 Claims, 9 Drawing Sheets (56) References Cited

U.S. PATENT DOCUMENTS

2014/0369627 A1* 12/2014 Huang ................ G06T 5/50
  382/309
2015/0002704 A1   1/2015 Vidal-Naquet
2016/0086342 A1*  3/2016 Yamaji ............... G06T 11/60
  382/103

OTHER PUBLICATIONS

Partial International Search Report—PCT/US2017/033849—ISA/EPO—dated Jul. 13, 2017.

* cited by examiner

METHOD AND SYSTEM FOR SMART GROUP PORTRAIT

FIELD

This disclosure generally relates to image processing, and more particularly to facial detection for photography.

BACKGROUND

When using a camera to capture an image of a group of multiple people, it can be challenging, especially in groups including children, to capture a single image where all participants in the group are exhibiting desirable facial characteristics (e.g., facing the camera, eyes open, smiling). Some solutions attempt to solve this problem by taking multiple images of the group in order to create a better image of the group in post processing. For example, best images corresponding to each group participant may be identified from the multiple images, which can be combined to form a single image.

However, such solutions may be time-consuming and non-user friendly, and may require manual labor by the user. In addition, such solutions may consume a large amount of memory space due to needing to capture and store multiple images. Furthermore, an acceptable image may not always be able to be constructed, if a usable image for one or more participants in the group is not captured.

SUMMARY

The systems, methods and devices of this disclosure each have several innovative aspects, no single one of which is solely responsible for the desirable attributes disclosed herein.

In an embodiment, a method for capturing an image of a group of individuals in a scene is provided. The method may comprise performing facial detection to identify one or more individuals of the group. The method may further comprise monitoring, for each identified individual, one or more features of the individual. The method may further comprise determining an image quality score for the individual based upon the one or more features of the individual, the image quality score indicative of how the individual will appear in a captured image of the group. The method may further comprise determining whether the image quality score for the individual satisfies one or more image quality threshold values. The method may further comprise capturing a sub-image of the individual, in response to a determination that the image quality score for the individual satisfies the one or more threshold values. The method may further comprise combining the captured sub-images for one or more of the identified individuals to form a single composite image of the group.

In an embodiment, an image capture system for capturing an image of a group of individuals in a scene is provided. The image capture system may comprise a memory configured to store image data. The image capture system may further comprise at least one processor. The at least one processor may be configured to perform facial detection to identify one or more individuals of the group. The at least one processor may be further configured to monitor, for each identified individual, one or more features of the individual. The at least one processor may be further configured to determine an image quality score for the individual based upon the one or more features of the individual, the image quality score indicative of how the individual will appear in a captured image of the group. The at least one processor may be further configured to determine whether the image quality score for the individual satisfies one or more image quality threshold values. The at least one processor may be further configured to capture a sub-image of the individual, in response to a determination that the image quality score for the individual satisfies the one or more threshold values. The at least one processor may be further configured to combine the captured sub-images for one or more of the identified individuals to form a single composite image of the group.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

Camera System

Figure 1:
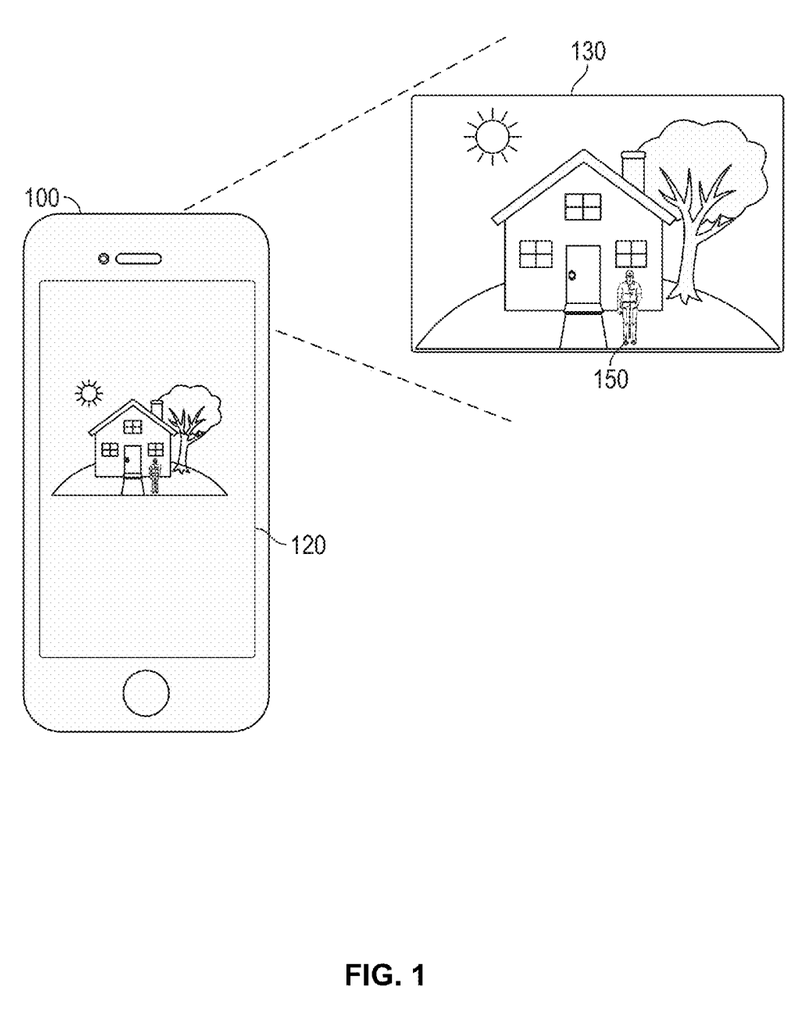
FIG. 1 illustrates an example of an apparatus (e.g., a mobile communication device) that includes an imaging system that can record images of a scene in accordance with aspects of this disclosure.

FIG. 1 illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1 shows an object 150 (e.g., a person) within the field of view 130 which may be captured by the camera. A processor within the apparatus 100 may perform various functions relating to the imaging device, which may include image capture functions (e.g., auto-focus), image processing functions (e.g., facial detection, capturing sub-images, and/or the like), etc. The apparatus 100 may comprise an imaging device or component as part of a system-on-chip (SoC). The SoC may include a central processing unit (CPU) that uses at least one RISC instruction set, and a single SoC may include multiple CPU cores, a graphics processing unit (GPU), a wireless modem, and other software and hardware to support a smartphone's global positioning system (GPS), camera, gesture recognition and video.

Figure 2:
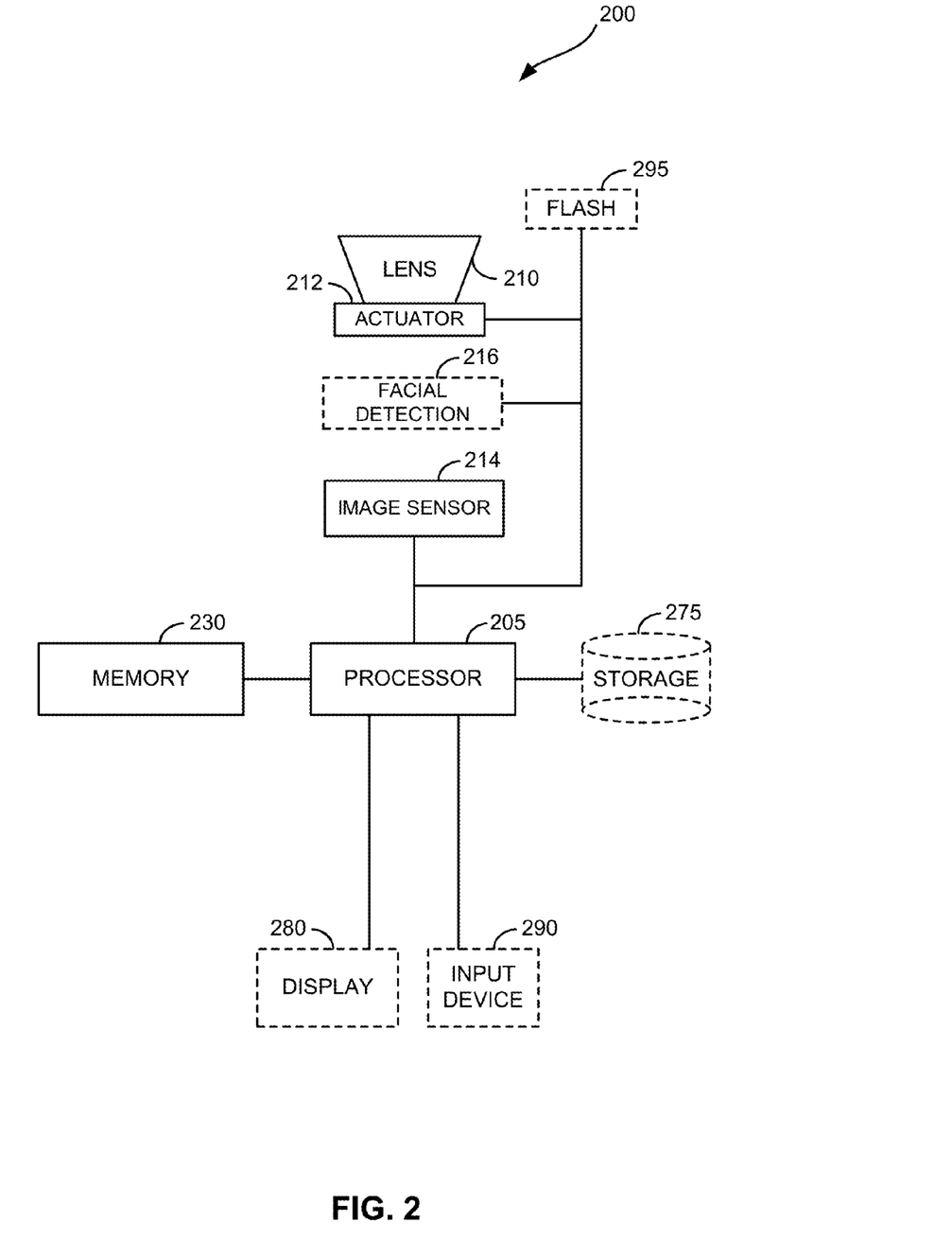
FIG. 2 depicts a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera, may include a processor 205 operatively connected to an image sensor 214, an optional facial detection integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200, such as performing facial detection, capturing images or sub-images, and/or the like.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus captured image. For example, the actuator 212 may be configured to move the lens 210 in a series of one or more lens movements to adjust the lens position to change the focus of an image.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the facial detection IC 216 may be used to perform facial detection on a captured image (e.g., captured by image sensor 214). Facial detection may be used to detect individuals within the camera's field of view, measure one or more facial characteristics of a detected individual, and/or the like. For example, the facial detection IC 216 may be used to detect each member of a group of individuals being photographed, and monitor their facial characteristics in order to determine a best time to capture an image. In some embodiments, facial detection may be performed by processor 205 instead of the facial detection IC 216, or by a combination of facial detection IC 216 and processor 205.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

Figure 5:
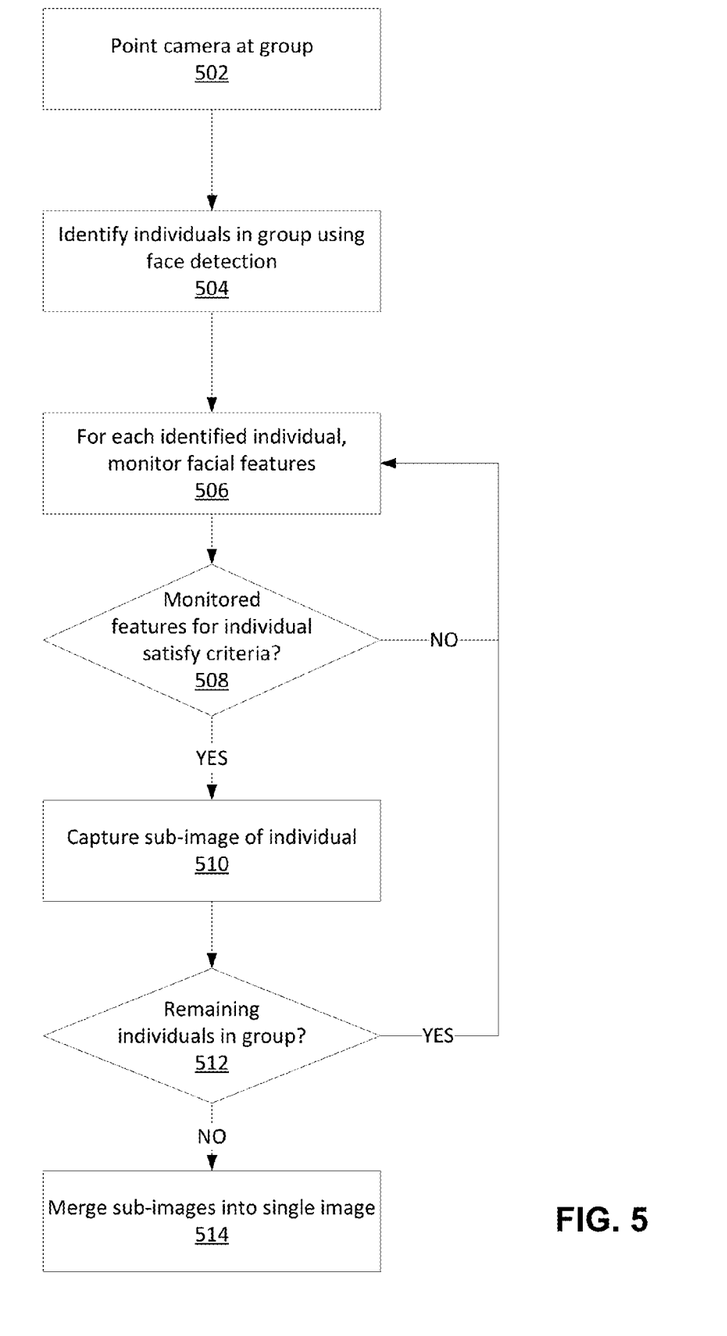
FIG. 5 illustrates a flowchart of a process for capturing an image of a group of individuals using facial detection and monitoring, in accordance with some embodiments.
Figure 6:
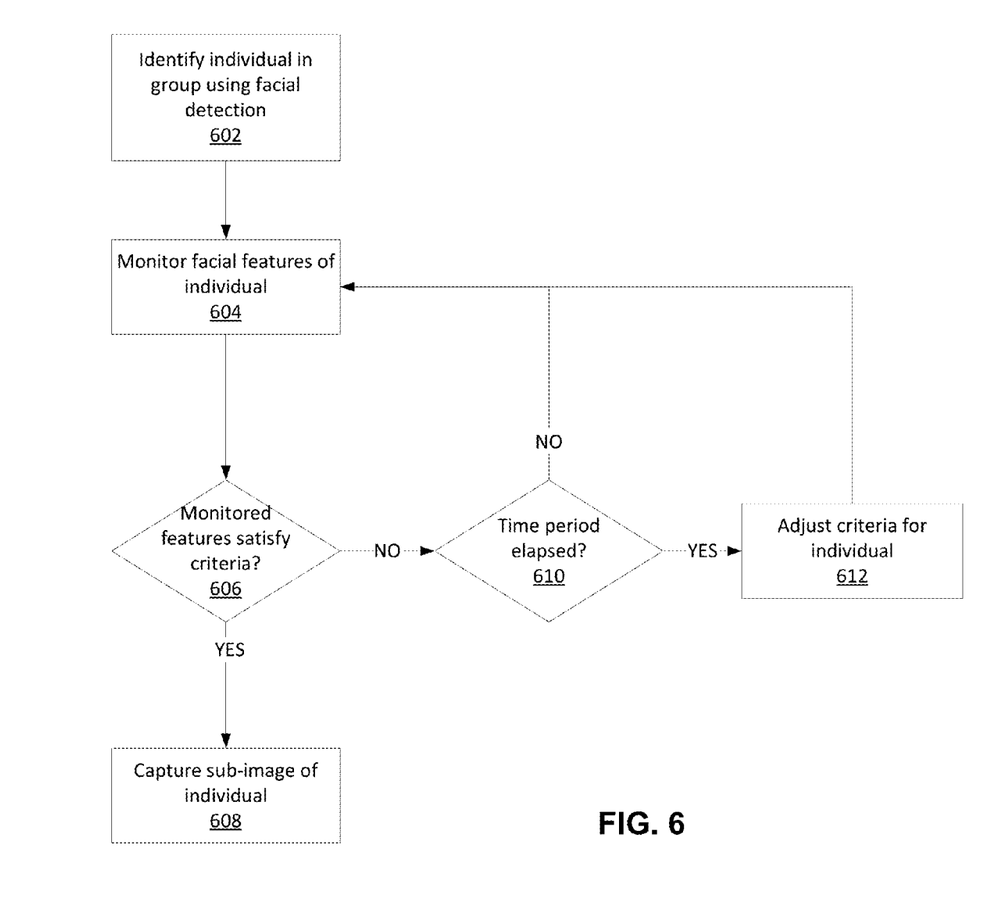
FIG. 6 illustrates a flowchart of a process for monitoring and capturing a sub-image for an individual, in accordance with some embodiments.

The memory 230 may be considered a computer readable medium and stores instructions for instructing the processor 205 and/or facial detection IC 216 to perform various functions in accordance with this disclosure. For example, in some aspects, memory 230 may be configured to store instructions that cause the processor 205 and/or facial detection IC 216 to perform various methods, such as those as described below and as illustrated in FIGS. 5-6.

Figure 3:
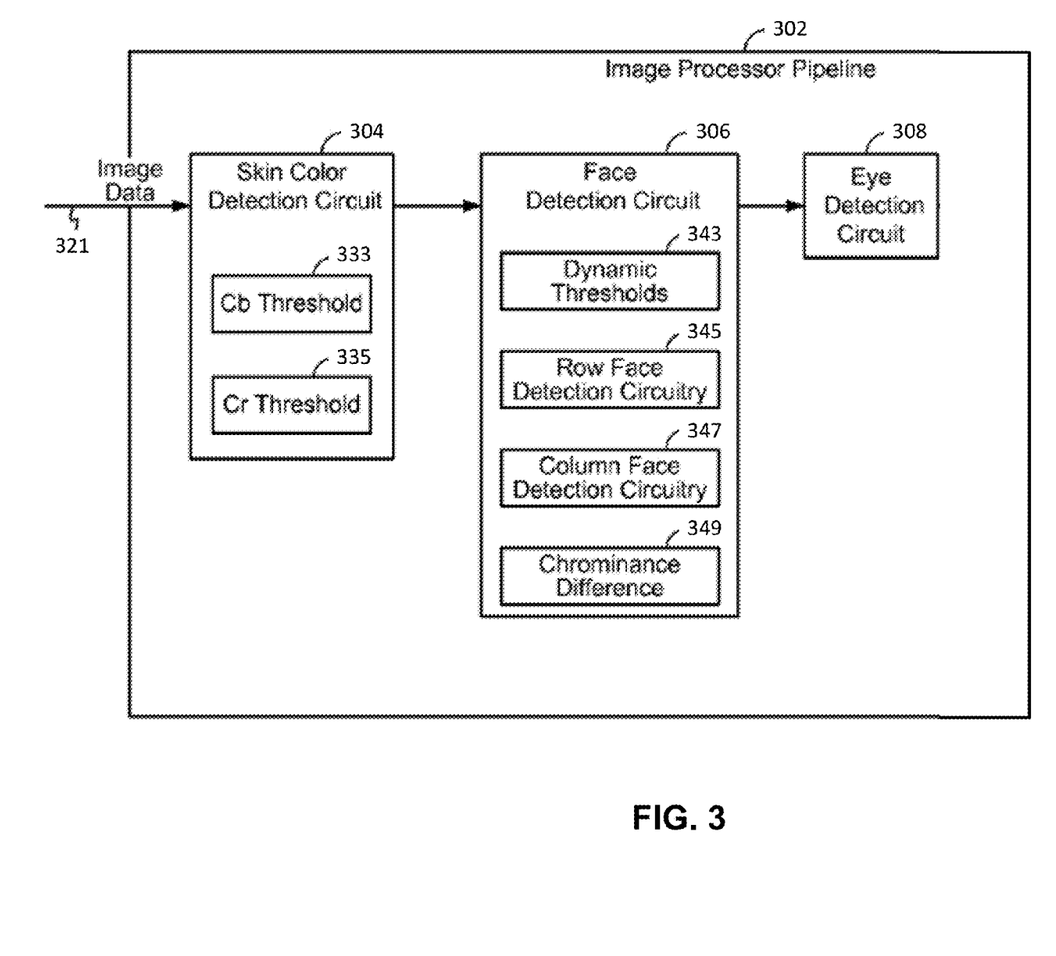
FIG. 3 depicts an example embodiment of an image processor pipeline that may be used to detect a face of an individual and to determine a viewpoint of the detected individual.

FIG. 3 depicts an example embodiment of an image processor pipeline 302 that may be used to detect a face of an individual and to determine a viewpoint of the detected individual. The image processor pipeline 302 may be implemented as part of facial detection IC 216 and/or processor 205. In some embodiments, the image processor pipeline 302 includes a skin color detection circuit 304, a face detection circuit 306, an eye detection circuit 308, a viewpoint detector responsive to skin color and face detection circuit 310, and a face location history circuit 312.

In a particular embodiment, the skin color detection circuit 304 may be configured to receive image data 321 corresponding to an image, and may be configured to compare chrominance values of the image data to determine whether each particular pixel of the image data corresponds to a skin color or to a non-skin color region. In a particular embodiment, the skin color detection circuit 304 includes a chrominance blue (Cb) threshold 333 and a chrominance red (Cr) threshold 335. For example, the skin color detection circuit 304 may compare a chrominance red value for a particular pixel to one or more chrominance red thresholds 335, such as an upper and lower chrominance red threshold, indicating non-skin areas. In addition, the skin color detection circuit 304 may determine a chrominance blue value of a pixel of the image data and compare the chrominance blue value to one or more chrominance blue thresholds 333 indicating borders between skin areas and non-skin areas. In a particular embodiment, the pixels having a chrominance value within the skin color range may be identified, such as by satisfying the chrominance blue threshold 333 and the chrominance red threshold 335 of the skin color detection circuit 304. The skin color detection circuit 304 may be configured to generate an output including the pixels that have a chrominance within the skin color range, indicating a skin color area.

In a particular embodiment, the face detection circuit 306 is configured to receive the skin color area output from the skin color detection circuit 304 and to detect a location of a face area within the image data. In a particular embodiment, the face detection circuit 306 includes dynamic thresholds 343, row face detection circuitry 345, column face detection circuitry 347, and chrominance difference circuitry 349.

In a particular embodiment, the face detection circuit 306 is configured to receive the output of the skin color detection circuit 304 including the pixels that have a chrominance value within the skin color range. In a particular embodiment, the row face detection circuitry 345 may be configured to identify a row of the image data and the column face detection circuitry 347 may be configured to identify a column of the image data. For example, the row face detection circuitry 345 may be configured to identify a row of the image data according to a first one dimensional search based on a chrominance mean value and a chrominance variance value, and the column face detection circuitry 347 may be configured to identify a column of the image data according to a second one dimensional search based on the chrominance mean value and the chrominance variance value. In a particular embodiment, the chrominance difference circuitry 349 may be configured to compare the chrominance value of an identified pixel to the chrominance mean value and to select the identified pixel in response to a comparison result satisfying a difference threshold. The difference threshold may be based on the chrominance variance value. In a particular embodiment, a first count of pixels or likelihood to the chrominance mean corresponding to a row of the selected pixel within the image data may be incremented when scanning more pixels within the candidate area and the difference threshold is satisfied at the pixels, and a second count of pixels or likelihood to the chrominance mean corresponding to a column of the selected pixel within the image data may be incremented when scanning more pixels within the candidate area and the difference threshold is satisfied at the pixels. In a particular embodiment, the column segment with the greatest count of pixels or likelihood to the chrominance mean that satisfies the difference threshold may be located, and the row segment with the greatest count of pixels or likelihood to the chrominance mean that satisfies the difference threshold may be located. The location of the peak column segment and the peak row segment may be used to determine an estimated center pixel location of the face area.

In a particular embodiment, the eye detection circuit 308 is configured to receive the face location data from the face detection circuit 306 and to detect the eyes of the person within the image data. The eye detection circuit 308 may be utilized to further refine the face location data and to confirm the location of a face within the face area.

In some embodiments, a circuit (e.g., eye detection circuit 308) may be used to evaluate an amount that the eyes of a detected face are open. In some embodiments, one or more curvature functions (e.g., a two-sided curvature function) may be utilized on the detected eyes to determine a degree of openness of the eyes. In some embodiments, a pupil of an eye may be detected and compared against a circle. For example, if the detected shape of a pupil is close to the shape of a circle, then it may be inferred that the eye is substantially open, and vice versa.

In some embodiments, other circuits may be configured to receive the face location data from the face detection circuit 306 and to detect other facial features associated with the person (e.g., mouth, nose, ears, and/or the like). In some embodiments, detected facial features may be analyzed and evaluated. For example, the detected eyes of the person may be used to determine a direction that the person is facing, the detected mouth of the person may be used to determine a degree of smile (e.g., based upon a curvature of the mouth), and/or the like.

In some embodiments, smiling face detection may be performed for a captured frame (e.g., using facial detection IC 216) by employing an object classifier that is trained to distinguish between smiling faces and all objects in the frame that are not smiling faces. In some embodiments, a list of detected smiling faces for a first frame may be employed as an input smiling face list for a subsequent frame. In some embodiments, for each frame after the first frame, a list of tracked smiling faces for the frame may be generated tracking smiling faces in the frame from the input smiling list for the frame. Further, a list of new smiling faces may be generated for the frame by combining a list of new smiling faces for the frame with the list of tracked smiles for the frame.

In some embodiments, upon the detection of several faces grouped together in a frame, an inference may be made that the scene is intended to be a group image and that there may be other faces within the image that have not yet been detected. In response, one or more parameters may be updated in order to improve detection of any remaining faces that may be present in the scene. For example, one or more thresholds of a facial detection algorithm may be updated for a search on a subsequent frame.

Other example systems and methods for facial detection are disclosed in U.S. Pat. No. 8,315,443, titled "Viewpoint Detector Based on Skin Color Area and Face Area," filed Apr. 22, 2010, and U.S. Pat. No. 8,965,046, titled "Method, Apparatus, and Manufacture for Smiling Face Detection," filed Mar. 16, 2012, which are hereby incorporated by reference in their entireties.

Group Facial Detection

In some embodiments, facial detection may be used in capturing better images of groups of individuals (e.g., photographing a group of people). In some embodiments, facial detection may be used to detect each individual of the group. Knowledge of the presence and locations of the individuals of the group may be used to allow the camera to auto-focus on each individual in the group (e.g., using the actuator 212 to position the lens 210), or performing other image capture or processing functions.

When taking pictures of an individual or groups of individuals, it is often desired that the individuals whose images are being captured display certain facial characteristics (e.g., eyes open, facing camera, smiling). In some embodiments, one or more features of a detected individual (e.g., facial features such as curvature of the mouth, relative positions of the inner and outer corners of the eyes, and/or the like) may be monitored to determine whether the individual is displaying the desired facial characteristics or to determine a degree of smile for the individual, wherein the individual is deemed to be displaying desired facial characteristics if the degree of smile for the individual satisfies a threshold amount.

Figure 4A:
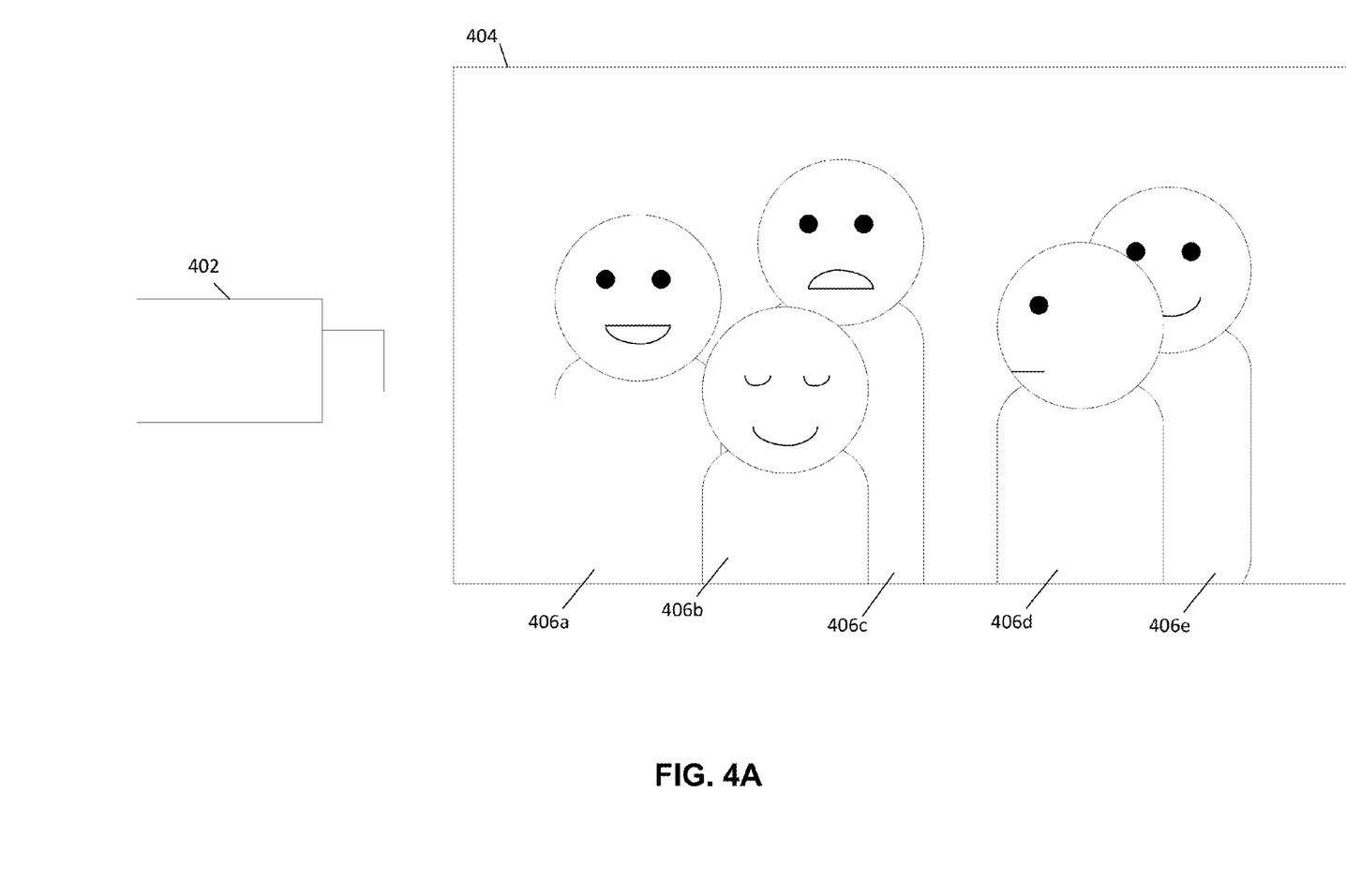
FIGS. 4A-4D illustrate an example of capturing an image of a group of individuals, in accordance with some embodiments.

However, when capture an image for a group of people, not all individuals in the group may be exhibiting desirable facial characteristics at the same time. For example, FIGS. 4A-4D illustrate an example of capturing an image of a group of individuals, in accordance with some embodiments. A camera 402 may be used to capture images of a scene 404 containing a group of people 406a-e. At a given time, different people 406a-e of the group may exhibit different facial features. For example, as illustrated in FIG. 4A, person 406a is facing the camera, smiling, and with eyes open. On the other hand, person 406b is facing the camera and smiling, but has closed eyes; person 406b is facing the camera with eyes open, but is not smiling; person 406d is not facing the camera; and person 406e is facing the camera and smiling with eyes open, but is partially blocked by person 406e.

As such, an image taken of scene 404 by camera 402 may not show all persons 406a-e of the group exhibiting desired facial characteristics. For example, as illustrated in FIG. 4A, only person 406a is exhibiting the desired facial characteristics, while the other people either are not exhibiting the desired facial characteristics (e.g., people 406b, c, and d) or have their face at least partially blocked from view (e.g., person 406e).

Figure 4B:
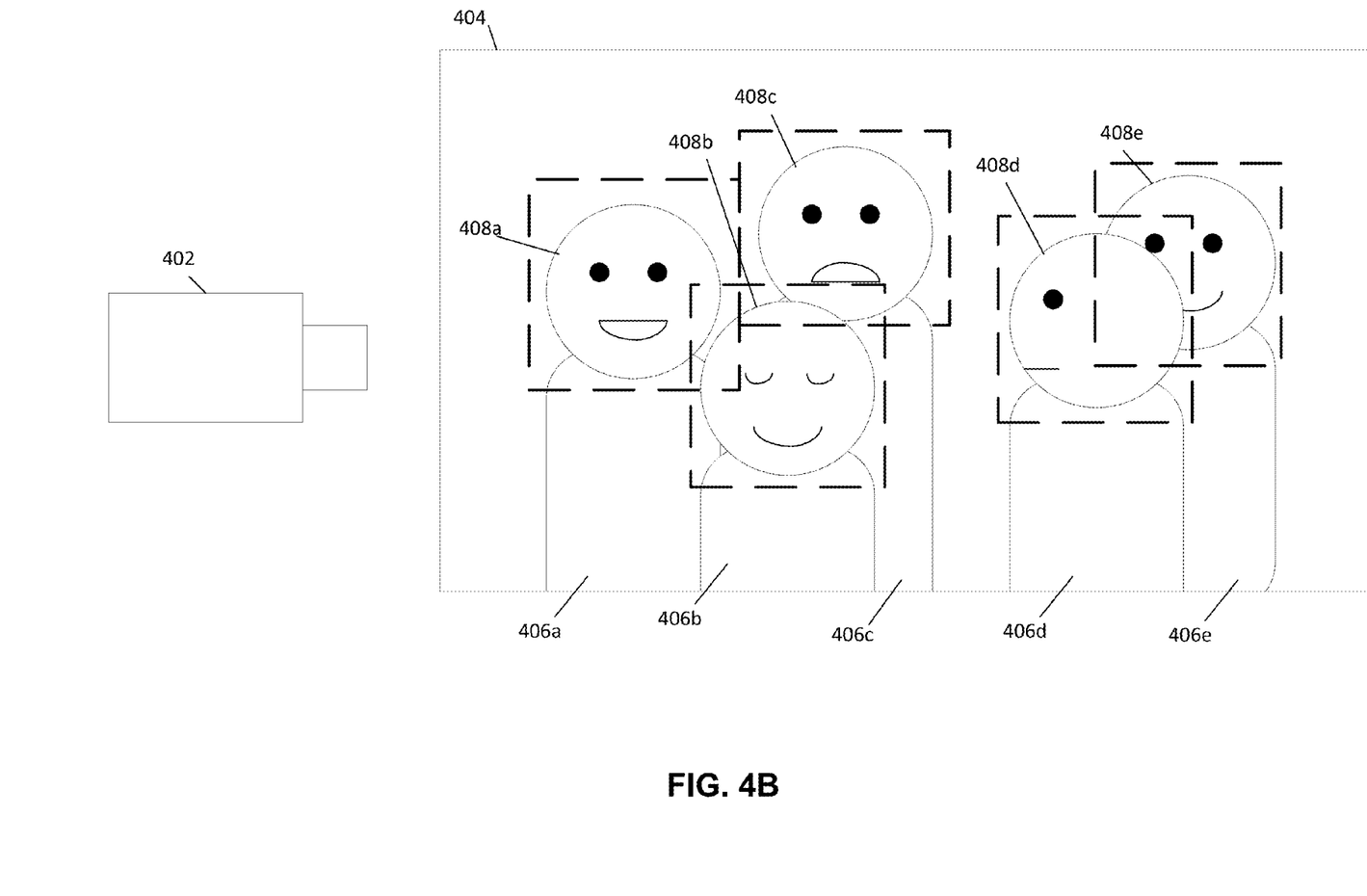

As illustrated in FIG. 4B, facial detection may be used to identify a face 408a-e of each person 406a-e of the group. In some embodiments, a processor or facial detection module associated with the camera (e.g., processor 205 and/or facial detection IC 216) may analyze an image captured by the camera 402 to identify one or more facial features (e.g., head, eyes, nose) in order to detect individual people present in the scene 404. In some embodiments, techniques such as skin tone detection, boundary detection, depth map generation, any of the techniques identified above, and/or the like, or any combination thereof, may be used. In some embodiments, facial detection can be used to identify an individual, even if the individual's face is not directly facing the camera (e.g., person 406d), or if a portion of the individual's face is obscured (e.g., person 406e). In some embodiments, facial detection may be based at least in part upon one or more user inputs. For example, a user may indicate using a touchscreen or other input device locations of each individual of the group in a scene.

The camera 402 may monitor the faces of each person 406a-e in scene 404. For example, facial features of each person 406a-e may be analyzed to determine if they meet certain criteria (e.g., facing camera, eyes open, smiling). In some embodiments, the analysis may comprise calculating one or more scores for each monitored individual indicating whether the individual is exhibiting desirable facial characteristics. For example, a score indicating a degree of smile may be determined for each person, wherein the person is considered to be exhibiting desired facial characteristics if the degree of smile exceeds a threshold value. Other scores may indicate an orientation of the person's face (e.g., based upon a viewpoint detection as described in FIG. 3), whether the person's eyes are open, and/or the like. If the facial features do not meet the criteria (e.g., degree of smile does not satisfy the threshold), then the camera 402 may continue to monitor the person. On the other hand, if it is determined that the facial features of the person meet the criteria, the camera 402 may capture a sub-image of the person.

Figure 4C:
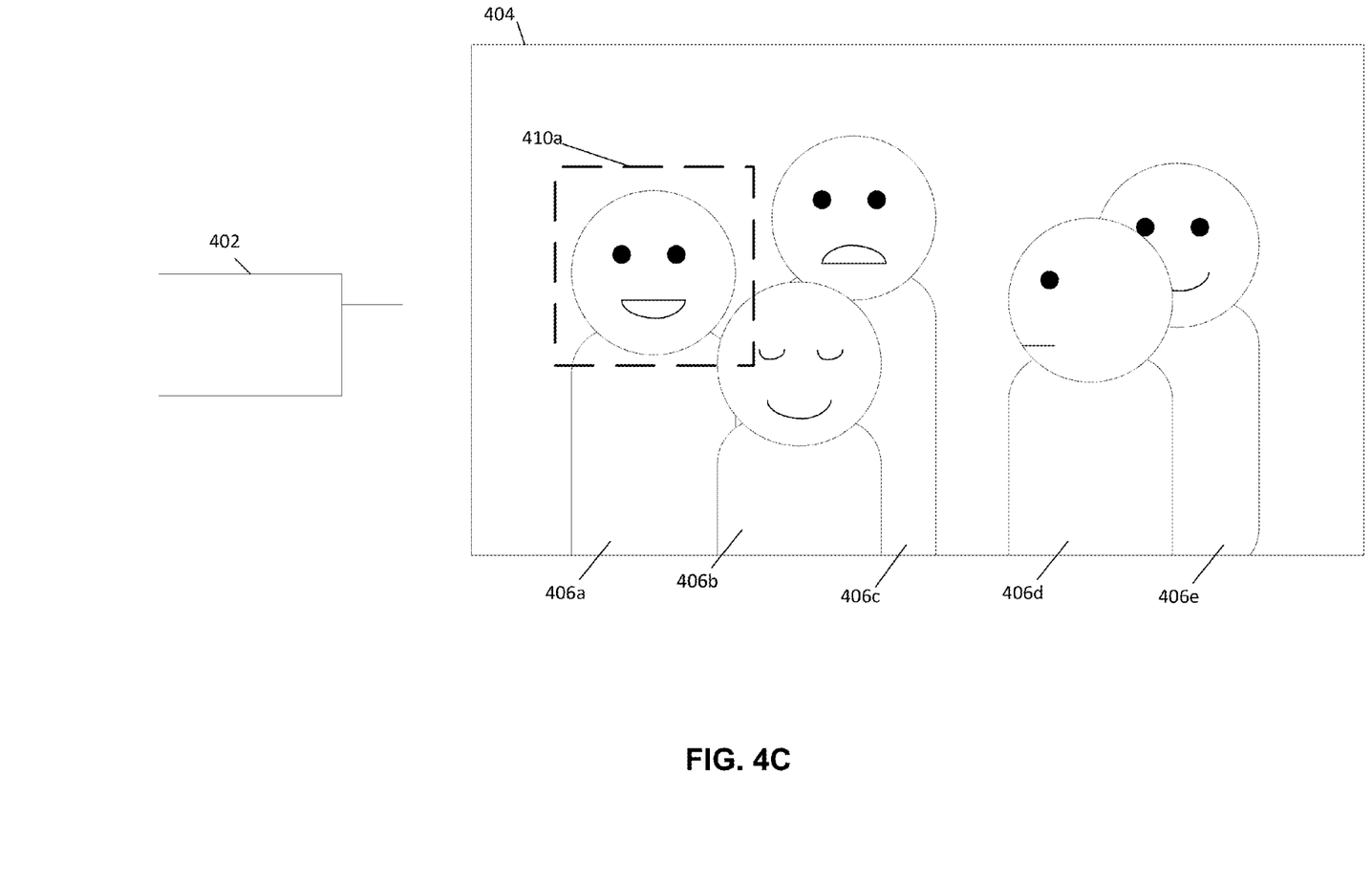

For example, as illustrated in FIG. 4C, person 406a is exhibiting facial features that meet the criteria. As such, the camera 402 captures a sub-image 410a of scene 404, the sub-image 410a including at least the face of the person 406a. Although FIG. 4C illustrates sub-image 410a as being substantially rectangular and sized based upon the size of the face of person 406a, in some embodiments, the sub-image may be of different shapes and cover a larger portion of scene 404.

In some embodiments, when the camera captures a sub-image of a particular person in the group, a user (e.g., a camera operator) may be notified. For example, in some embodiments, the camera 402 may include a display (e.g., display 280) that may display a visual indicator to the user indicating that a sub-image being captured of a person (e.g., person 406a) of the group, such as an outline around the person corresponding to the captured sub-image, or some other visual effect.

Figure 4D:
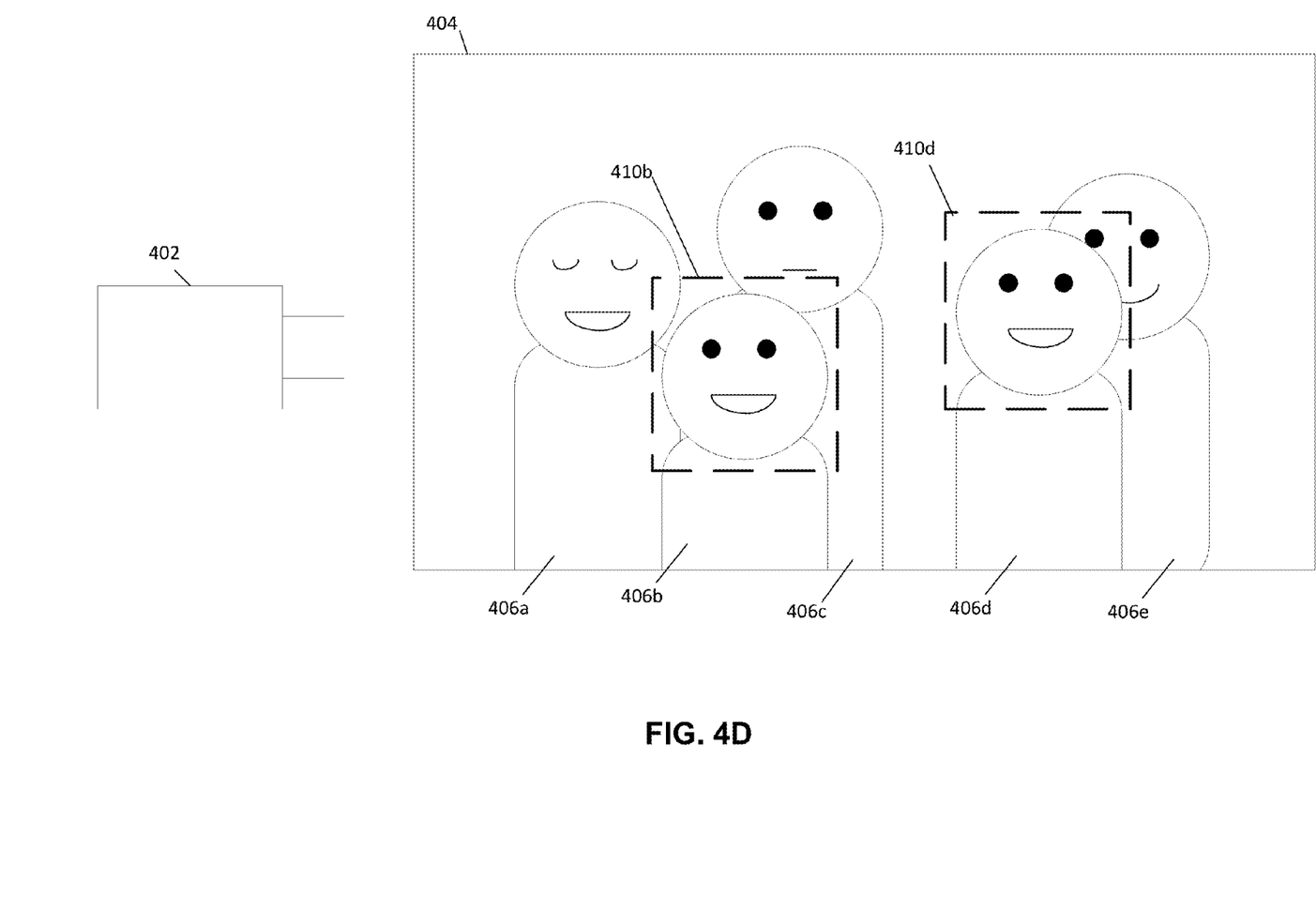

As the facial features of the persons 406a-e of the group change over time, the camera 402 may to monitor the facial features of the remaining people in the group (e.g., people 406b-e). For example, as illustrated in FIG. 4D, the facial features of persons 406b and 406d have changed to meet the criteria. As such, the camera 402 may capture additional sub-images 410b and 410d corresponding to persons 406b and 406d. In addition, the camera may continue to monitor persons 406c and 406e, due to sub-images having not yet been captured for them.

On the other hand, because a sub-image has already been captured for person 406a, person 406a may no longer be monitored. In some embodiments, person 406a may continue to be monitored, wherein an additional sub-image for person 406a may be captured if person 406a is detected is displaying more desirable facial characteristics in comparison to when the sub-image for person 406a was captured, as indicated by one or more calculated scores (e.g., exhibits a degree of smile greater than the degree of smile when the first sub-image of the person was taken). In some embodiments, both the initial sub-image and the additional sub-image may be stored, allowing the user to choose which sub-image to use. In other embodiments, the additional sub-image may automatically replace the initial sub-image.

In some embodiments, once sub-images are captured for all persons in the group, the sub-images may be combined to form a complete image, wherein each member of the group is shown exhibiting the desirable facial characteristics (e.g., degree of smile greater than the threshold value).

FIG. 5 illustrates a flowchart of a process for capturing an image of a group of individuals using facial detection and monitoring, in accordance with some embodiments. At block 502, a camera is pointed towards scene containing a group of individuals. At block 504, individuals of the group are identified using facial detection. In some embodiments, facial detection may be based upon detecting one or more facial features of each individual in the group. Facial detection may also be based upon boundary detection, depth map generation, one or more user inputs, and/or the like.

At block 506, facial features for each of the identified individuals are monitored. In some embodiments, the monitored facial features of each identified individual are used to calculate one or more scores indicating one or more aspects of the individual relevant to photographing the individual (e.g., facial orientation/viewpoint, facial expression such as degree of smile, and/or like). The scores may be compared against one or more criteria, which may correspond to facial characteristics generally considered desirable when photographing an individual. In some embodiments, the criteria may relate to the shape and relative positions of certain facial features of the individual (e.g., corners of mouth, curvature of mouth, relative positions of inner corner of eyes, outer corner of eyes, and/or the like).

For example, a degree of smile may be calculated for a monitored individual, indicating an amount that the individual is smiling. The individual may be considered to be exhibiting desirable facial characteristics when the degree of smile is above a threshold value. In some embodiments, desirable facial characteristics may correspond to the degree of smile being between a first lower threshold value and a second higher threshold value.

For each monitored individual, at block 508, a determination is made as to whether the monitored facial features of the individual satisfy the criteria (e.g., the degree of smile for the individual satisfies the threshold value). If the criteria are not satisfied, the individual may continue to be monitored at block 506.

On the other hand, if it is determined that the facial features of a monitored individual satisfy the criteria, then at block 510, a sub-image corresponding to the individual may be captured. As discussed above, the sub-image may correspond to a portion of the scene containing at least the face of the monitored individual.

In some embodiments, each sub-image for an individual may substantially conform to an outline of the individual. For example, segmentation methods and/or tracking of movement of the individual may be used to determine an outline of the individual. In some embodiments, edge detection methods may be used to determine an outline of the individual. In some embodiments, the sub-image may include one or more background portions of the frame, which may be later removed via a comparison with a background image.

In some embodiments, one or more images may be captured in order to determine a background of the image. As individuals move around between frames, the background may be updated using the leftover uncovered parts of the scene that are revealed by the movement. In some embodiments, when a sub-image for an individual is formed, portions of the sub-image may be removed from the sub-images of other individuals.

In some embodiments, if there is an overlap between one or more individuals (e.g., a first individual standing in front of a second individual partially obscuring the second individual), a boundary of a sub image may be defined close to the outline of the individual. Additional parts of the individual may later be taken from other sub-images to complete the missing parts (e.g., obscured parts) of the individual. In some embodiments, a sub-image may be captured of a pair of overlapping individuals together, wherein the sub-image is captured based upon the facial features of both individuals satisfying the criteria.

At block 512, a determination is made as to whether there are any remaining identified individuals in the group for which a sub-image as not yet been captured. If it is determined that there are remaining identified individuals in the group for which a sub-image has not been captured, the process may return to block 506, where facial features of the remaining individuals may continue to be monitored.

On the other hand, if it is determined that there are no remaining identified individuals in the group for which a sub-image has not been captured, then at block 514, the captured sub-images may be combined to form a single composite image of the group. In some embodiments, combining the captured sub-images may be performed automatically without input from a user (e.g., camera operator). In some embodiments, the one or more sub-images may be combined with one or more background images (corresponding to one or more portions of the scene unassociated with a face of an individual of the group) to form the single composite image. In some embodiments, each sub-image may be analyzed to identify one or more borders with other captured sub-images and/or background images. In some embodiments, the borders of one or more captured sub-images may be blended in order to form a single composite image using the captured sub-images.

The system, by monitoring facial features of each individual of the group, is able determine a best time to capture a sub-image of the individual. For example, a sub-image may be captured of a detected individual when it is determined that the individual's monitored features meet certain criteria (e.g., eyes open, facing camera, smiling). As such, sub-images may be automatically captured for each individual of the group, which may then be combined to form a single composite image of the group, without the need for user input or post-processing. In addition, by capturing sub-images for individuals of the group instead of multiple images of the entire group, an amount of memory use may be reduced.

Capturing Images with Non-Compliant Group Members

When capturing an image of a group of individuals, it is generally desirable to be able to capture the image within a reasonable period of time. For example, it may be desired to be able to capture an image of a group within a range of 1 to 10 seconds. However, sometimes some individuals in the group may not exhibit the desired facial characteristics within a designated period of time (e.g., crying children, people with an aversion to smiling). As a result, the camera may not be able to capture an adequate sub-image for one or more individuals within the designated period of time.

In some embodiments, if the camera is unable to capture a suitable sub-image for one or more monitored individuals of the group, the user may be notified. In some embodiments, a display of the camera (e.g., display 280) may display one or more visual indicators indicating that a suitable sub-image was not able to be captured for one or more monitored individuals (hereafter also referred to as "non-compliant individuals"). For example, the display may display a red outline around the faces of the non-compliant individuals. This may allow the user to inform the non-compliant individuals to change their facial expression and/or facial position (e.g., by telling the individual to move). In addition, the user may be prompted to approve additional time for capturing a suitable sub-image for the non-compliant individuals.

In some embodiments, one or more rules may be used to determine how closely an individual's facial characteristics meet the criteria. For example, in some embodiments, an individual fully facing the camera but not smiling may be considered to be more desirable than an individual who is smiling but whose face is turned half away from the camera.

In some embodiments, the camera may capture and store a most suitable sub-image for an individual (e.g., corresponding to a time where the facial characteristics of the individual most closely meet the criteria). If the facial characteristics of the individual later improve (e.g., more closely meet the criteria), a new sub-image may be captured. As such, a "best so far" sub-image may be maintained for an individual even if they do not exhibit the desired facial characteristics meeting the criteria. In some embodiments, if a sub-image is not able to be captured of the individual within a designated period of time, the "best so far" sub-image may be displayed to the user instead.

In some embodiments, if the camera is unable to capture a suitable sub-image for one or more non-compliant individuals with a designated period of time, the system may relax the criteria for capturing a sub-image and continue to monitor the one or more individuals (e.g., by adjusting one or more score thresholds). For example, where a detected degree of smile is considered to satisfy a criteria when between a first threshold value and a second threshold value, the first threshold value may be lowered and/or the second threshold value raised, such a broader range of smiles will be considered to satisfy the criteria, increasing the chance that a sub-image will be able to be captured for the non-compliant individuals.

FIG. 6 illustrates a flowchart of a process for monitoring and capturing a sub-image for an individual, in accordance with some embodiments. At block 602, an individual of the group is identified. In some embodiments, the individual may be identified using facial detection techniques.

At block 604, the facial features of the identified individual are monitored. For example, in some embodiments, one or more facial features of the individual (e.g., mouth, eyes) may be analyzed to determine whether the individual is exhibiting certain desired facial characteristics (e.g., facing camera, eyes open, smiling). In some embodiments, the detected facial features of the individual may be used to determine one or more scores (e.g., a degree of smiling indicating how much the individual is smiling).

At block 606, a determination is made as to whether the monitored features of the individual satisfy one or more criteria. For example, in some embodiments, the criteria may comprise thresholds for one or more scores, indicating aspects of the individual such as a degree which the individual is facing the camera, a degree of how open the individual's eyes appear, a degree of smiling of the individual, and/or the like. In some embodiments, the determination may comprise comparing a determined degree of smile of the individual against one or more threshold values.

If the facial features of the individual are deemed to satisfy the criteria (e.g., the one or more scores satisfy their corresponding thresholds), then at block 608, a sub-image of the individual may be captured. On the other hand, if the monitored facial features of the individual do not satisfy the criteria, the process may proceed to block 610, where a determination is made as to whether a designated period of time has elapsed. If the designated period of time as not yet elapsed, then the individual may continue to be monitored (block 604).

In some embodiments, if the designated time period has elapsed, then at block 612, the criteria for the individual may be adjusted. In some embodiments, the criteria may be adjusted to be more easily satisfied. For example, if a criteria for a degree of smile is determined to be satisfied when degree of smile of the individual is between a first lower threshold value and a second higher threshold value, the first lower threshold value may be lowered and/or the second higher threshold value be raised, such that a broader range of degrees of smile may be deemed to satisfy the criteria. In some embodiments, one or more criteria may be removed. For example, a criteria for degree of smile may be removed, such that a sub-image may be captured of the individual as long as other criteria are satisfied (e.g., facing the camera, eyes open), regardless of the individual's degree of smile. The individual may then continue to be monitored (at block 604) based upon the adjusted criteria.

In some embodiments, instead of adjusting the criteria, a closest sub-image may be captured of the individual during a second designated period of time. For example, after it is determined that the designated period of time has elapsed, the system may monitor the individual for a second designated period of time, wherein a sub-image for the individual may be maintained corresponding to a time when the determined scores for the individual most closely satisfies the criteria during the second designated period of time.

In some embodiments, the user may also be notified that a sub-image was not captured for the individual within the designated time period (e.g., due to the individual not exhibiting facial characteristics satisfying the criteria). This may allow the user to inform the individual to adjust their facial position or expression. In addition, the user may be prompted to allow for more time to capture a sub-image for the individual, approve one or more adjustments to the criteria, and/or the like.

Other Considerations

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for capturing an image of a group of individuals in a scene, the method comprising:
performing facial detection to detect one or more individuals of the group;
monitoring, for each detected individual, one or more features of the individual;
determining an image quality score for each individual based upon the one or more features of the individual, the image quality score indicative of how the individual will appear in a captured image of the group;
determining whether the image quality score for each individual is within a first threshold range, the first threshold range indicative of a range of smiles;
capturing a sub-image of each individual when the image quality score for that individual is within the first threshold range, including capturing a first sub-image of a first individual when the image quality score for the first individual is within the first threshold range;
continuing to monitor the one or more features of the first individual after the sub-image of the first individual is captured;
capturing a second sub-image of the first individual if the image quality score for the first individual is greater than the image quality score for the first individual when the first sub-image was captured, the second sub-image replacing the first sub-image; and
combining the captured sub-images to form a single composite image of the group.

2. The method of claim 1, wherein the determination that the image quality score is within the first threshold range is indicative of the individual's smile being within the range of smiles.

3. The method of claim 1, further comprising:
determining whether the image quality score for one or more individuals is within a second threshold range, the second threshold range indicative of a degree of openness of the individual's eyes; and
capturing a sub-image of one or more individuals when the image quality score for that individual is within the second threshold range.

4. The method of claim 1, further comprising:
adjusting the first threshold range in response to a determination that the image quality score for one or more individuals is not within the first threshold range within a period of time; and
monitoring the one or more features of the individual for an additional period of time.

5. The method of claim 1, further comprising:
in response to a determination that the image quality score for one or more individuals, based upon the one or more monitored features of the individual, is not within the first threshold range within a period of time, capturing a sub-image of each individual wherein the image quality score for that individual most closely satisfies the first threshold range.

6. The method of claim 1, further comprising:
notifying a user in response to a determination that the one or more monitored features of one or more of the individuals do not satisfy one or more criteria within a period of time; and
receiving an indication from the user to continue monitoring the one or more individuals for an additional period of time.

7. The method of claim 1, further comprising, in response to the image quality score for a second individuals not being within the first threshold range within a designated period of time:
capturing a third sub-image of the second individual, wherein the image quality score for the second individual is not within the first threshold range; and
in response to a determination that the image quality score for the second individual more closely satisfies the first threshold range, capturing a fourth sub-image of the second individual replacing the third sub-image.

8. The method of claim 1, further comprising:
capturing at least one background image of the scene, wherein combining the captured sub-images for one or more of the individuals to form a single composite image of the group comprises combining the captured sub-images with the at least one background image.

9. The method of claim 8, further comprising:
in response to a determination of a movement by one or more individuals of the group, updating the at least one background image based at least in part upon the movement.

10. The method of claim 1, further comprising:
determining that two or more individuals in the scene overlap with each other; and
capturing a sub-image of the two or more individuals, in response to a determination that the image quality scores for each of the two or more individuals are within the first threshold range.

11. An image capture system for capturing an image of a group of individuals in a scene, comprising:
an image sensor configured to capture image data of the scene;
a memory configured to store image data;
at least one processor, configured to:
receive image data of the scene from the image sensor;
perform facial detection on the received image data to detect one or more individuals of the group in the scene;
monitor, for each detected individual, one or more features of the individual;
determine an image quality score for each individual based upon the one or more features of the individual, the image quality score indicative of how the individual will appear in a captured image of the group;
determine whether the image quality score for each individual is within a first threshold range, the first threshold range indicative of a range of smiles;
capture a sub-image of each individual when the image quality score for that individual is within the first threshold range, including capturing a first sub-image of a first individual when the image quality score for the first individual is within the first threshold range;
continue to monitor the one or more features of the first individual after the sub-image of the first individual is captured;
capture a second sub-image of the first individual if the image quality score for the first individual is greater than the image quality score for the first individual when the first sub-image was captured, the second sub-image replacing the first sub-image; and
combine the captured sub-images to form a single composite image of the group.

12. The image capture system of claim 11, wherein the determination that the image quality score is within the first threshold range is indicative of the individual's smile being within the range of smiles.

13. The image capture system of claim 11, wherein the at least one processor is further configured to:
determine whether the image quality score for one or more individuals is within a second threshold range, the second threshold range indicative of a degree of openness of the individual's eyes; and
capture a sub-image of one or more individuals when the image quality score for that individual is within the second threshold range.

14. The image capture system of claim 11, wherein the at least one processor is further configured to:
adjust the first threshold range in response to a determination that the image quality score for one or more individuals is not within the first threshold range within a period of time; and
monitor the one or more features of the individual for an additional period of time.

15. The image capture system of claim 11, wherein the at least one processor is further configured to:
in response to a determination that the image quality score for one or more individuals based upon the one or more monitored features of the individual, is not within the first threshold range within a period of time, capture a sub-image of each individual wherein the image quality score for that individual most closely satisfies the first threshold range.

16. The image capture system of claim 11, wherein the at least one processor is further configured to:
notify a user in response to a determination that the one or more monitored features of the one or more individuals do not satisfy one or more criteria within a period of time;
receive an indication from the user to continue monitoring the one or more individuals for an additional period of time.

17. The image capture system of claim 11, wherein the at least one processor is further configured to, in response to the image quality score for a second individual not being within the first threshold range within a period of time:
capture a third sub-image of the second individual, wherein the image quality score for the second individual is not within the first threshold range;
in response to a determination that the image quality score for the second individual more closely satisfies the first threshold range, capture a fourth sub-image of the second individual replacing the third sub-image.

18. The image capture system of claim 11, wherein the at least one processor is further configured to:
capture at least one background image of the scene, wherein combining the captured sub-images for one or more of the individuals to form a single composite image of the group comprises combining the captured sub-images with the at least one background image.

19. The image capture system of claim 18, wherein the at least one processor is further configured to:

in response to a determination of a movement by one or more individuals of the group, update the at least one background image based at least in part upon the movement.

20. The image capture system of claim 11, wherein the at least one processor is further configured to, in response to the image quality score for one or more individuals is not determined to be within the first threshold range within a period of time:
   determine that two or more individuals in the scene overlap with each other; and
   capture a sub-image of the two or more individuals, in response to a determination that the image quality scores for each of the two or more individuals are within the first threshold range.

* * * * *